US012117823B1

(12) United States Patent
Spirko et al.

(10) Patent No.: US 12,117,823 B1
(45) Date of Patent: Oct. 15, 2024

(54) MONITORING SYSTEMS AND METHODS FOR ASSESSING RISK

(71) Applicant: United Services Automobile Association (USAA), San Antonio, TX (US)

(72) Inventors: Jason Paul Spirko, Peoria, AZ (US); Joseph Wayman, Glendale, AZ (US); Darren Lee Ellis, Phoenix, AZ (US); Frank Edward Clark, Universal City, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 507 days.

(21) Appl. No.: 17/344,401

(22) Filed: Jun. 10, 2021

Related U.S. Application Data

(60) Provisional application No. 63/126,925, filed on Dec. 17, 2020, provisional application No. 63/037,409, filed on Jun. 10, 2020.

(51) Int. Cl.
*G05B 23/02* (2006.01)
*G06F 16/22* (2019.01)
*G06F 16/23* (2019.01)

(52) U.S. Cl.
CPC ..... *G05B 23/0286* (2013.01); *G05B 23/0221* (2013.01); *G06F 16/2228* (2019.01); *G06F 16/2379* (2019.01)

(58) Field of Classification Search
CPC ............ G05B 23/0286; G05B 23/0221; G06F 16/2228; G06F 16/2379
See application file for complete search history.

(56) References Cited

U.S. PATENT DOCUMENTS

| | | | |
|---|---|---|---|
| 10,769,908 B1* | 9/2020 | Burris | G06V 40/10 |
| 2010/0089067 A1* | 4/2010 | Wilkes | G05B 23/0254 703/2 |
| 2012/0046989 A1* | 2/2012 | Baikalov | G06Q 10/0635 705/7.28 |
| 2014/0257918 A1* | 9/2014 | Spencer | G06Q 10/0635 705/7.28 |
| 2015/0286792 A1* | 10/2015 | Gardner | G06Q 40/08 705/3 |
| 2016/0117623 A1* | 4/2016 | Hoover | G06F 3/0481 705/7.28 |
| 2018/0032040 A1* | 2/2018 | Sweet, III | H04N 7/181 |
| 2018/0117416 A1* | 5/2018 | Armour | A63B 71/0619 |
| 2019/0259499 A1* | 8/2019 | Hong | G16H 50/20 |
| 2019/0380311 A1* | 12/2019 | Crouthamel | A01K 11/004 |
| 2020/0312434 A1* | 10/2020 | Turgeon | G16H 20/10 |

* cited by examiner

*Primary Examiner* — Santosh R Poudel
(74) *Attorney, Agent, or Firm* — Fletcher Yoder, PC

(57) ABSTRACT

The presently disclosed systems and methods provide monitoring systems and methods for assessing risk based on individual risk control categories. In an embodiment, the risk is assessed based on data for a particular control category. A subset of the data is weighted according to a first weighting function, and a different subset of the data is weighted according to a second weighting function. The weighted data is combined to generate a control health index that may be used to assess risk.

15 Claims, 16 Drawing Sheets

| DATA COMPONENT | VALUES | SCORING |
|---|---|---|
| REQUIREMENTS (LAWS AND REGS) | YES<br>NO OR NULL | 10<br>0 |
| ITGC | YES<br>NO OR NULL | 10<br>0 |
| FRAMEWORK REFERENCE (UCF) | YES<br>NO OR NULL | 10<br>0 |
| INHERENT RISK | LOW<br>MEDIUM<br>HIGH<br>CRITICAL | 0<br>5<br>10<br>20 |
| ICFR | YES<br>NO | 10<br>0 |
| CRITICALITY | KEY<br>NON-KEY | 10<br>0 |
| MAX TOTAL (PREWEIGHTING)<br>MAX TOTAL (POSTWEIGHTING of .25) | | 70<br>17.5 |

FIG. 2

| DATA COMPONENT | VALUES | SCORING |
|---|---|---|
| REQUIREMENTS (LAWS AND REGS) | YES<br>NO (NULL) | YES<br>NO |
| ITGC | ITCG<br>NULL | YES<br>NO |
| ICFR | ICFR<br>NULL | YES<br>NO |
| CRITICALITY | KEY<br>NON-KEY | YES<br>NO |
| ISSUE STATUS | OPEN (ALL STATUSES EXCEPT BELOW)<br><br>CLOSED OR CANCELED | YES<br><br>NO |

| SEVERITY LEVEL | RESPONSE COUNT |
|---|---|
| CRITICAL | 4-5 |
| HIGH | 3 |
| MODERATE | 2 |
| LOW | 1 |

FIG. 3

| DATA COMPONENT | VALUES | SCORING |
|---|---|---|
| ISSUES* | 2ND LINE COMPLIANCE-HIRED EXTERNAL AUDITOR/CONSULTANT<br>2ND LINE RISK-HIRED EXTERNAL AUDITOR/CONSULTANT<br>2ND LINE COMPLIANCE SELF-IDENTIFIED<br>3RD LINE HIRED-EXTERNAL AUDITOR OR CONSULTANT<br>AUDIT IDENTIFIED-SCI<br>COMPLIANCE IDENTIFIED | 0<br>0<br>0<br>0<br>0<br>0 |
| | COMPLIANCE IDENTIFIED-SCI<br>COMPLIANCE TESTING<br>COMPLIANCE-MEMBER INITIATED<br>ENFORCEMENT ACTION<br>EXTERNAL EXAM/REGULATOR IDENTIFIED<br>MRA | 0<br>0<br>0<br>0<br>0<br>0 |
| | MRIA<br>OBSERVATION<br>RISK MANAGEMENT IDENTIFIED<br>RISK MANAGEMENT IDENTIFIED SCI<br>RISK METRIC EXCEEDANCE<br>1ST LINE CONTROL TESTING | 0<br>0<br>0<br>0<br>0<br>20 |
| | 1ST LINE IDENTIFIED – SCI<br>1ST LINE MANAGEMENT IDENTIFIED<br>1ST LINE HIRED-EXTERNAL AUDITOR OR CONSULTANT<br>BUSINESS CONTINUATION<br>DE ASSESSMENT IDENTIFIED<br>E2E PRODUCT REVIEWS | 20<br>20<br>20<br>20<br>20<br>20 |
| | EIG IDENTIFIED<br>ESG IDENTIFIED<br>SEE SOMETHING SAY SOMETHING | 20<br>20<br>20 |

FIG. 4

| DATA COMPONENT | VALUES | SCORING |
|---|---|---|
| NATURE | AUTOMATED<br>AUTOMATED W /MANUAL COMPONENT<br>MANUAL | 10<br>5<br>0 |
| OPERATING EFFECTIVENESS* | STRONG<br>ADEQUATE<br>WEAK<br>NOT RATED OF N/A | 20<br>10<br>–10<br>0 |
| DESIGN EFFECTIVENESS* | STRONG<br>ADEQUATE<br>WEAK<br>NOT RATED OF N/A | 20<br>10<br>–10<br>0 |
| RESIDUAL RISK | LOW<br>MEDIUM<br>HIGH<br>CRITICAL | 30<br>20<br>10<br>0 |
| REFRESHED (MODIFIED)* | YES<br>NO<br>> 365 DAYS | 10<br>0<br>0 |
| REPEAT ISSUE | YES<br>NO | –10<br>0 |
| MAX TOTAL (PREWEIGHTING)<br>MAX TOTAL (POSTWEIGHTING of .25) | | 110<br>82.5 |

FIG. 5

| DATA COMPONENT | VALUES | SCORING |
|---|---|---|
| NATURE*** | AUTOMATED<br>AUTOMATED W/MANUAL COMPONENT<br>MANUAL (WITH TESTING IN PAST 365 DAYS)<br>MANUAL (WITH NO TESTING IN PAST 365 DAYS OR NULL) | 30<br>20<br>10<br>0 |
| OPERATING EFFECTIVENESS** | EFFECTIVE<br>INEFFECTIVE<br>NOT RATED OR NULL | 30<br>-10<br>0 |
| DESIGN EFFECTIVENESS** | EFFECTIVE<br>INEFFECTIVE<br>NOT RATED OR NULL | 30<br>-10<br>0 |
| REPEAT ISSUE | YES<br>NO | -10<br>0 |
| ISSUE RATING** | CRITICAL<br>HIGH<br>MEDIUM<br>LOW<br>NULL (N/A) | -20<br>-15<br>-10<br>-5<br>0 |
| PURPOSE | PREVENTIVE<br>DETECTIVE | 10<br>5 |
| MAX TOTAL | | 100 |

FIG. 6

| OWNER ORG (MULTIPLE VALUES) EXECUTIVE LEVEL 1 (ALL) MANAGEMENT (ALL) CONTROL OWNER (ALL) SUB-CATEGORY 1 (ALL) SUB-CATEGORY 2 (ALL) SUB-CATEGORY 3 (ALL) LINE OF BUSINESS (PL-1) (ALL) MEMBER NEED (PL-2) (ALL) EXPERIENCE (PL-3) (ALL) PROCESS (PL-4) (ALL) CONTROL OF NATURE (ALL) KEY (ALL) CONTROL ID (ALL) BOUNDARY ORG CAO | CONTROL COUNT BY RATING ||||| CHI SCORE TREND (ROLLING 12 MONTHS) |||||||| (MoM) TREND || CHI SCORE |
|---|---|---|---|---|---|---|---|---|---|---|---|---|---|---|---|
| COSA | WEAK | INSUFFICIENT | SATISFACTORY | STRONG | TOTAL | 2020-09 | 2020-10 | 2020-11 | 2020-12 | 2021-01 | 2021-02 | MoM VARIANCE | | AVG. CHI | |
| CAO | 368 | 140 | 89 | 468 | 1,045 | 33.07 | 36.16 | 33.17 | 33.90 | 33.89 | 32.31 | -1.58 | -4.7% ⇨ | 41.95 | ○ |
| CFO | 554 | 219 | 31 | 1,029 | 1,826 | 18.38 | 20.11 | 21.33 | 21.97 | 22.55 | 25.22 | 2.68 | 11.9% ⇨ | 43.90 | ○ |
| CLO | 45 | 2 | 3 | 15 | 66 | 15.45 | 16.74 | 29.07 | 25.91 | 24.00 | 22.68 | -1.32 | -5.5% ⇨ | 19.60 | ⊘ |
| COS | 35 | 5 | 0 | 65 | 105 | 38.96 | 49.40 | 51.67 | 52.17 | 42.35 | 37.95 | -4.40 | -10.4% ⇨ | 46.65 | ○ |
| ERC | 157 | 18 | 5 | 49 | 228 | 14.53 | 16.58 | 15.03 | 16.01 | 16.01 | 17.10 | 1.09 | 6.8% ⇨ | 19.63 | ⊘ |
| FSB | 718 | 486 | 46 | 773 | 2,015 | 25.20 | 27.45 | 27.48 | 27.95 | 27.43 | 26.98 | -0.45 | -1.7% ⇨ | 36.59 | ⊘ |
| HR | 124 | 22 | 10 | 221 | 374 | 31.19 | 43.49 | 46.06 | 49.29 | 37.09 | 33.70 | -3.39 | -9.1% ⇨ | 40.16 | ○ |
| ISCO | 2 | 1 | 0 | 5 | 8 | 23.13 | 24.38 | 24.38 | 24.38 | 26.57 | 37.22 | 10.56 | 39.6% ⇨ | 63.18 | ⊘ |
| LIFE | 15 | 35 | 1 | 147 | 198 | 38.17 | 37.14 | 38.69 | 38.45 | 40.90 | 44.35 | 3.46 | 8.4% ⇨ | 66.23 | ⊘ |
| PNC | 173 | 79 | 7 | 298 | 557 | 44.62 | 45.07 | 50.35 | 52.84 | 46.51 | 49.74 | 3.23 | 6.9% ⇨ | 42.83 | ○ |
| OVERALL | 2,191 | 1,007 | 192 | 3,069 | 6,421 | 25.71 | 28.21 | 28.78 | 28.90 | 29.25 | 29.70 | 0.45 | 1.5% ⇨ | 40.02 | ○ |

FIG. 7

| CONTROL NAME | CONTROL ID | CONTROL DESCRIPTION |
|---|---|---|
| SOI-PS-ANNAPOLIS DURESS ALARM DEVICES | CTRL-1000011571 | QUARTERLY, A PROTECTIVE SECURITY OFFICER AND/OR DELEGATE AND SECURITY OPERATION CENTER (SOC) OPERATOR OR DELEGATE WILL VALIDATE DURESS ALARMS ARE FUNCTIONING PROPERLY BY ACTIVATING THE ALARM AND VERIFYING THE ALARM IS TRIGGERED TO ENSURE TIMELY AND APPROPRIATE RESPONSE TO EMERGENCY INCIDENTS THAT MAY IMPACT WORKFORCE AND PROPERTY ASSETS. IF A DURESS ALARM DOES NOT TRIGGER CORRECTLY, THE SOC OPERATOR AND/OR DELEGATE WILL SUBMIT A WORK ORDER AND/OR FRONT DOOR REQUEST FOR RESOLUTION |
| SOI-PS-PHOENIX-PERFORM GATE ACCESS | CTRL-1000093958 | EACH TIME THERE IS A DOOR FORCED, EMERGENCY EXIT, INPUT DOOR BREACH, DOOR HELD, OR SECURE AREA BREACH DOOR EVENT IN THE PHYSICAL ACCESS CONTROL SYSTEM, THE SECURITY OPERATIONS CENTER (SOC) OPERATOR WILL ACKNOWLEDGE THE EVENT WITHIN 2 MINUTES. IF THE EVENT IS NOT ACKNOWLEDGED WITHIN THE TIMEFRAME, A NOTIFICATION IS AUTOMATICALLY ROUTED TO THE PS SUPERVISOR OR DELEGATE FOR DECISION |
| SOI-PS-PHOENIX-PERFORM GATE ACCESS | CTRL-1000011743 | QUARTERLY, THE PROTECTIVE SECURITY (PS) SUPERVISOR AND/OR DELEGATE ENSURES OPERATING PERFORMANCE AND VALIDATION OF EVIMS AT GATES IS COMPLIANT WITH ACCESS PROCEDURES DESIGNED TO PREVENT UNAUTHORIZED ACCESS TO PROPERTY AND FACILITIES. IF IT IS IDENTIFIED THAT PROCEDURES ARE NOT BEING FOLLOWED, THE PS SUPERVISOR AND/OR DELEGATE WILL ESCALATE AND DETERMINE APPROPRIATE ACTIONS |
| SOI-TAG-AUTOMATIC UPDATE OF THE PHYSICAL ACCESS CONTROL SYSTEM FOR A SEPARATION | CTRL-108242 | EVERY 15 MINUTES, A FILE CONTAINING CHANGES TO HUMAN RESOURCE (HR) PERSON RECORDS IS AUTOMATICALLY SENT TO THE PHYSICAL SECURITY ACCESS CONTROL SYSTEM TO PREVENT UNAUTHORIZED ACCESS TO PROPERTY AND FACILITIES. THE SERVICE ACCOUNT AUTOMATICALLY UPDATES THE DATABASE WITH THE CURRENT FILE, THEREBY DISABLING FUNCTIONALITY AND CLEARANCES FOR INDIVIDUALS CLASSIFIED AS TERMINATION, DEATH, OR RETIRED |
| SOI-PS-PERFORM BUILDING ACCESS | CTRL-108266 | ACCESS TO ALL AREAS SECURED BY BADGE READERS IS AUTOMATICALLY VALIDATED IN REAL-TIME BY THE SYSTEM AS EACH BADGE IS PRESENTED FOR ALL LOCATIONS. IF ACCESS ATTEMPTS EXCEED THE LIMITS DEFINED BY THE SYSTEM, ACCESS IS DENIED FOR EACH OCCURRENCE. THE SYSTEM RULES FOR ACCESS ARE DEFINED IN THE SYSTEM AND ARE DETERMINED BY JOB FUNCTION OR RESPONSIBILITIES (I.E. ACTIVE, CLEARANCE LEVEL, ANTI-PASSBACK EXEMPTION) |

FIG. 14

MONITORING SYSTEMS AND METHODS FOR ASSESSING RISK

CROSS-REFERENCE TO RELATED APPLICATIONS

The present disclosure claims priority to and the benefit of U.S. Provisional Application No. 63/037,409, filed on Jun. 10, 2020 and U.S. Provisional Application No. 63/126,925, filed on Dec. 17, 2020, the disclosures of which are hereby incorporated by reference in their entirety for all purposes.

BACKGROUND

The present disclosure relates generally to techniques for risk assessment, and more particularly to monitoring risk and combining various risk metrics.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In many fields, operators wish to understand and identify areas of risk in both a granular and global sense. Certain individual risk areas may be controlled under regulatory guidance, such as workplace environmental conditions or manufactured product regulation, while other areas may be controlled under industry or internal standards. Still further, certain areas of risk, such as physical security, may apply company-wide, with other areas of risk, such as exposure to particular materials, are specific to only certain employees. Accordingly, it is difficult to assess a total risk picture at any given time.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a risk monitoring system is provided that includes a first database and a plurality of sensors that provide sensor data to the first database to populate respective fields of the first database. The system includes a computing device comprising a second database and a control system comprising a processor and a volatile memory. The volatile memory comprises processor-executable instructions configured to cause the processor to receive data from the first database comprising the sensor data; populate fields of the second database with the data, wherein the second database assigns the data to an individual risk control of a plurality of risk controls; generate an index based on the data, wherein the index is part of a plurality of indices based on the plurality of risk controls, and wherein each index of the plurality is on a same scale; identify that the index is below a threshold; and automatically control a device associated with the assigned data for the individual risk control to generate the assigned data at higher frequency.

In one embodiment, a risk monitoring system is provided that includes a first database and a plurality of sensors that provide sensor data to the first database to populate respective fields of the first database. The system includes a computing device comprising a second database and a control system comprising a processor and a volatile memory. The volatile memory comprises processor-executable instructions configured to cause the processor to receive data from the first database; populate fields of the second database with the data, wherein the second database assigns the data to an individual risk control of a plurality of risk controls; extract control category data of each individual risk control from the second database; perform a first weighting function on a first subset of the control category data for each individual risk control to generate a first score of the first subset; perform a second weighting function on a second subset of the control category data for each individual risk control to generate a second score of the second subset, wherein the first weighting function has a different weight than the second weighting function, and wherein the first subset and the second subset are non-overlapping; and generate an index for each individual risk control based on the first score and the second score, wherein the index is part of a plurality of indices of the plurality of risk controls, and wherein each risk index is on a same scale.

In an embodiment, a method is provided that includes the steps of receiving data related to a plurality of risk controls; performing a first weighting function on a first subset of the data for each individual risk control to generate a first score of the first subset; performing a second weighting function on a second subset of the control category data for each individual risk control to generate a second score of the second subset, wherein the first weighting function has a different weight than the second weighting function, and wherein the first subset and the second subset are non-overlapping; and generating an index for each individual risk control based on the first score and the second score, wherein the index is part of a plurality of indices of the plurality of risk controls, and wherein each index is on a same scale.

BRIEF DESCRIPTION OF THE DRAWINGS

Various aspects of this disclosure may be better understood upon reading the following detailed description and upon reference to the drawings in which:

FIG. 2 shows example data components, according to embodiments of the present disclosure;

FIG. 3 shows example data components, according to embodiments of the present disclosure;

FIG. 4 shows example data components, according to embodiments of the present disclosure;

FIG. 5 shows example data components, according to embodiments of the present disclosure;

FIG. 6 shows example data components, according to embodiments of the present disclosure;

FIG. 7 shows an example graphical user interface, according to embodiments of the present disclosure;

FIG. 14 shows example control category data, according to embodiments of the present disclosure;

DETAILED DESCRIPTION

Figure 1:
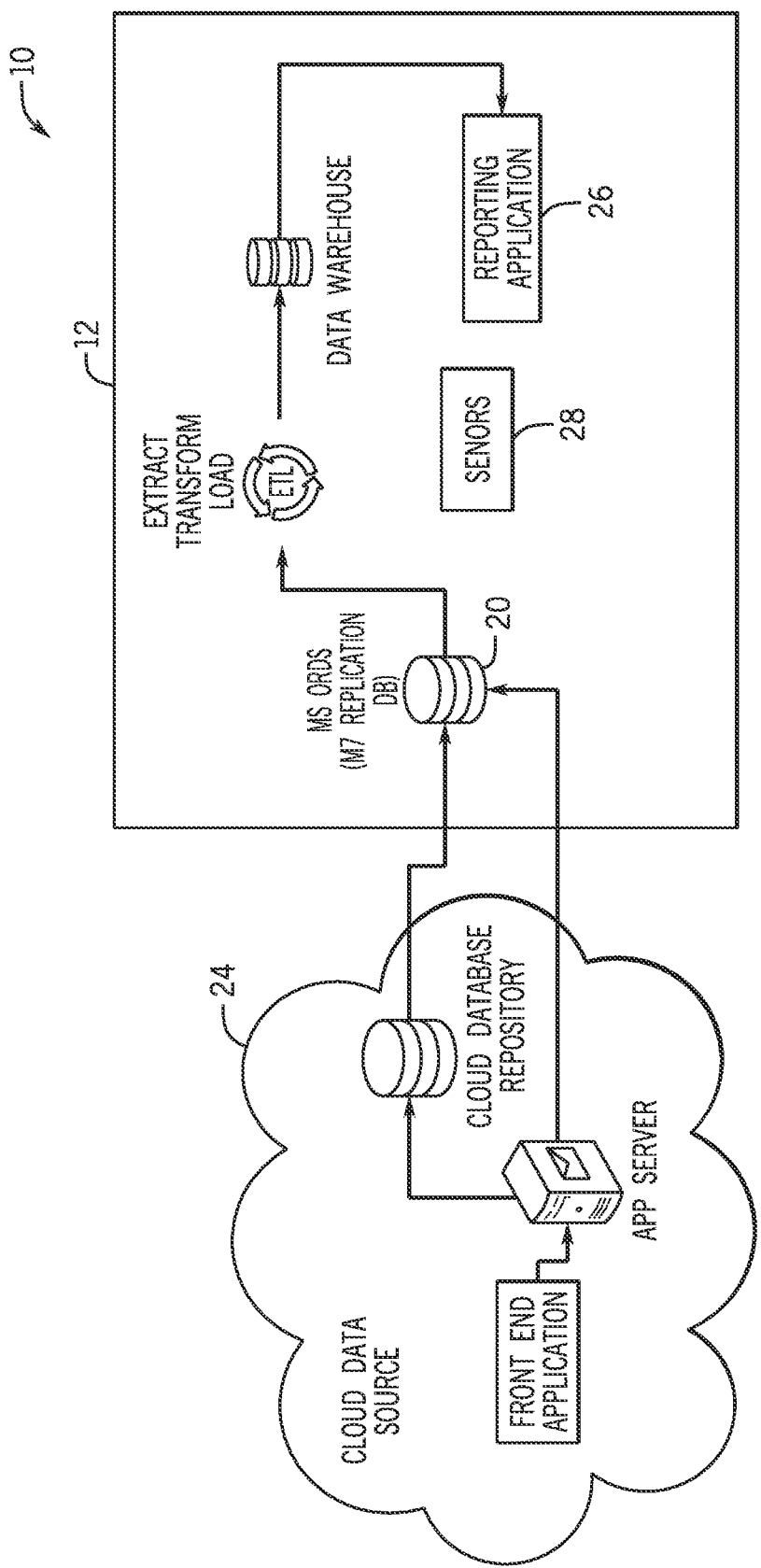
FIG. 1 is a block diagram of a system according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The presently disclosed systems and methods relate risk monitoring and assessment techniques that provide risk owners insight into the state of their control environment, through a quantitative methodology, to make more informed risk-based decisions on how and where to focus efforts to strengthen the environment and properly and effectively mitigate risk. The disclosed techniques provide an operator interface and tool that receives inputs from a variety of data sources and converts these inputs into individual indices that are indicative of a risk for a particular controlled area of an environment. The techniques generate a plurality of indices all on a same scale so that an operator can identify a risk threat or a risk level across a variety of areas and so that these indices may be effectively combined to promote more efficient computing and analysis. The disclosure provides an organization with a risk management program a strategic advantage to appropriately mitigate or treat risk, optimize prioritization, streamline costs, while providing a tool demonstrating compliance to appropriate regulatory agencies or for internal review. Further, the present techniques permit assessment of individual risk controls to determine if the correct controls are being used, provide a more comprehensive view of control characteristics and stronger visibility of the state of current controls and desired state through prioritization, permit individual control owners to contribute more effectively during risk inventories and assessments to improve controls at a local level, and permit more efficient balancing between risk tolerance of an individual organization and regulatory compliance. In embodiments, the techniques can be used to prioritize controls being proposed into the framework. In embodiments, the techniques provide a key evaluative measure in determining control strengthening effectiveness, what strengthening tends to increase health indices and can become predictive and part of recommendation prioritization.

As provided herein, a control may be a variable in a process or environment that is controlled between least two settings that can be adjusted or manipulated. In an embodiment, the at least two settings are on and off binary settings. Further, the control may be adjusted at more granular levels to adjust a speed, frequency, power, output, flow, density, level, presence or absence, and/or other parameter of the controlled variable. Thus, the disclosed techniques assess the risks of and/or the improvements that can be achieved by manipulation of settings of a control or a group of controls in combination. The assessment may also include automatic adjustment of the settings to improve overall process reliability or environmental attributes. An embodiment includes an algorithmic computation of control environment factors that measures critical control attributes, based on their stored data, and assigns them a numerical scoring value. The attributes are placed into two categories, priority or quality, where the scores are summed and, in embodiments, are multiplied by a weighting, which calculate the final CHI score or control health index. Based on the values, the controls and their respective scores can be grouped into health zones. The algorithm is foundational, meaning the logic is meant to expand to other components of risk management, such as at the process level and its health. As risk management evolves, as well as a constantly changing regulatory environment, the algorithm is maintainable and adjustable and able to accommodate various industries and their risk programs as well as variable risk tolerance levels.

In an embodiment, the algorithm includes a first weighting function and a second weighting function. The first weighting function operates on a first subset of scores generated by the data related to a particular category of attribute of the control and a second weighting function operates on a second subset of the scores generated by the data related to a particular category of attribute of the control. In an embodiment, the algorithm is as follows:

Quality score: (Control Nature+Control Operating Effectiveness+Control Design Effectiveness+Issue Identification Type+Residual Risk+Control Modification+Repeat Issue)*0.75)+Priority score: (Requirement mapping+ITGC indication+ICFR indication+Control Framework+Inherent Risk+Control Criticality)*0.25)=Overall CHI score While the disclosure algorithm has assigned weights of 0.75 to the quality score and 0.25 to the priority score, it should be understood that these weights are by way of example and may be adjusted. In an embodiment, the quality score is weighted higher than the priority score. In an embodiment, the quality score is weighted with a weighting factor that is at least double a factor for the priority score.

The algorithm logic may be adapted within multiple risk settings. With the foundation being flexible, the algorithm is easily maintained and modular, increasing computing efficiency. The data flow allows for a streamlined and automated process providing more real-time based data, which allows for creation of reporting, data visualizations, trending and forecasting, and serves as the prioritization tool needed to make decisions while facilitating risk complains and mitigation. The algorithm allows for expansion into other components of a risk program to provide even more transparency and actionable information.

In additional embodiments, the disclosed risk monitoring and assessment techniques permit combined assessment of qualitative metrics that are provided by a stakeholder together with automatic assessments that are generated by hardware instruments such as security readers, environmental sensors, proximity sensors, etc. The techniques provide heat maps of areas of concern and convert seemingly unrelated or independent data metrics into a single interface.

With the foregoing in mind, FIG. 1 is a block diagram of a risk monitoring system 10, according to embodiments of the present disclosure. As illustrated, the system 10 includes a computing system 12, which may be implemented on one or more suitable electronic computing devices, such as a server, computer, laptop, personal computer, mobile device, smartphone, tablet, wearable device, and so on. The computing system 12 may include a control system (see FIG. 10) that includes one or more processors and one or more volatile memory devices and that operates to perform the risk monitoring assessment as provided herein.

The computing system 12 may also include a database 20 that is communicatively coupled to a databases or databases of a cloud data source 24 via any suitable communication network or networks, including a mobile communication network, a Wi-Fi network, local area network (LAN), wide area network (WAN), and/or the Internet. The database 20 may include any suitable software or hardware components. In some embodiments, the database may be implemented as a virtual machine that emulates a computer system on the computing device 12.

The computing system 12 may also include a user interface application. In particular, the user interface application may cause a user interface, e.g., a graphical user interface as provided herein, to be displayed on an electronic display of a user device as part of a reporting application 26. The user interface may include user interface controls, such as drop-down menus, buttons, or text boxes to enable the user to enter database names and/or field names to identify database index and/or fields. The system 12 may include any suitable electronic computing device, such as a server, computer, laptop, personal computer, mobile device, smartphone, tablet, wearable device, and so on. A user device may be communicatively coupled to the computing system 12 via any suitable communication network or networks, including a mobile communication network, a Wi-Fi network, local area network (LAN), wide area network (WAN), and/or the Internet.

The reporting application 26 may also display information such as reports, such as graphical visualizations of the information (e.g., bar graphs, pie charts, plots), associated metrics, suggested actions via a graphical user interface.

The system 10 may include one or more sensors 28, such as environmental sensors (temperature, air quality, chemical), proximity sensors (RFID readers, optical sensors), interactive sensors (pressure or capacitive sensors), security sensors (door opening sensors) that feed data into the system 10 as part of the control health index assessment. In an embodiment, the sensors 28 include one or more cybersecurity sensors, such as network taps, internet activity sensors, etc.

FIGS. 2-6 show example data components of risk controls. Certain control attributes may be deemed to serve as a higher importance or additional need of focus based on their potential values.

As illustrated in FIGS. 2-3, these may include an assessment of a control attribute based on its potential priority value to generate a priority score for a particular attribute category and aid in attribute selection. It should be understood that priority values may be organization-specific and may be configurable/selectable. In an embodiment, priority values may include:

Requirements (Laws and Regulations)—Referring to controls mapping to and mitigating a law and/or regulation for compliance;

ITGC (Information Technology General Controls)—Determination if the control applies to most or all systems, components, processes, and/or data;

Framework Reference (UCF-Unified Compliance Framework of standards from around the world)—Is control mapped to legal mandate(s) and/or industry standard(s);

Inherent Risk—Assessment of the risk present prior to intervention;

ICFR (Internal Control Over Financial Reportiong)—Does control affect financial reporting; and Criticality—Is the control the primary control to mitigate a risk(s).

As illustrated, each particular control data component or category has values (e.g., category data) that in turn are associated with a particular score. As shown, the scoring may be according to a truth table to provide a score based on a yes input (maximum score for the subcategory) or a no or null input (zero score for the subcategory). For certain attributes, the inherent risk may be according to risk level, with different assigned scores at different inherent risk levels. The data, e.g., the control category data, may be provided as inputs, which in turn generate the scores. The inputs may be user inputs, sensors inputs, etc.

In a particular example, the disclosed techniques permit users to identify, assess, rank, and/or select potential controls according to the analysis. For example, a control such as information security may map to user privacy laws and/or regulations, depending on the organization. Thus, the score is positive and contributes to the priority portion of the overall score for risk monitoring. Information security may also touch many areas of a business, and may also be part of industry standards. Further, certain industries may operate with higher inherent data security risks than others. Accordingly, the priority of a particular control is elevated based on these features. The priority score portion of the index may be a less dynamic feature of a control relative to the assessed quality portion, which may be more affected by actions of the organization and therefore, more sensitive to improvement. For example, the status of individual industry regulations may be relatively long-term. However, the disclosed techniques permit modeling of potential regulation changes as they may affect controls in an organization and permit end users to identify if a regulatory change will touch many controls or only a few to increase risk.

While a score of a particular control may be elevated due to its priority, certain control attributes may be assessed the overall strength of a particular control to determine a quality portion of an index.

FIGS. 4-6 are examples of data components (categories) of the control environment attribute selection and quality score potential values. Control attributes may be deemed to assist in assessing the overall strength of a control based on their potential value. That is, the present techniques permit category data input related to a control to be assessed based on scores reflecting the relative importance or quality of the input.

The issues shown in FIG. 4 score if there is linkage to a control is mapped to an identified issue and how was it identified. In one example, different scores for risks identified by auditors or compliance personnel vs. risks identified in direct testing (higher risk). Further, the scoring may weight risk identification from personnel with ownership of the control higher than outside assessment.

FIGS. 5-6 shows certain additional example component of the control environment attribute selection and quality score potential values that include:

Nature—Manner in which a control is executed in terms of dependencies;

Operating Effectiveness—Performance assessment of control's ability to mitigate risk(s);

Design Effectiveness—Assessment of a control's overall design to mitigate risk;

Residual Risk—Amount of risk remaining after implementation of mitigation controls;

Refreshed (Modified)—Has control been reviewed and modified in the past 365 days; and Repeat Issue—Identified multiple issues post a closure of prior issue.

The scoring may be based on a score assignment for different categories of the control. In one example, controls that have been repeat issues are scored as being of higher risk (by lowering a quality score) relative to one-offs. In another example, automated controls are assessed as less risk (by increasing a quality score) than manual controls.

FIG. 7 shows an example graphical user interface including a report that may be navigated by a user of the system 10. The display is an executive overview showing scores by owner, control counts by rating, monthly variation and direction of change, rolling 12-month trending sparkline, and score reference (e.g., as in FIGS. 2-6).

Figure 8:
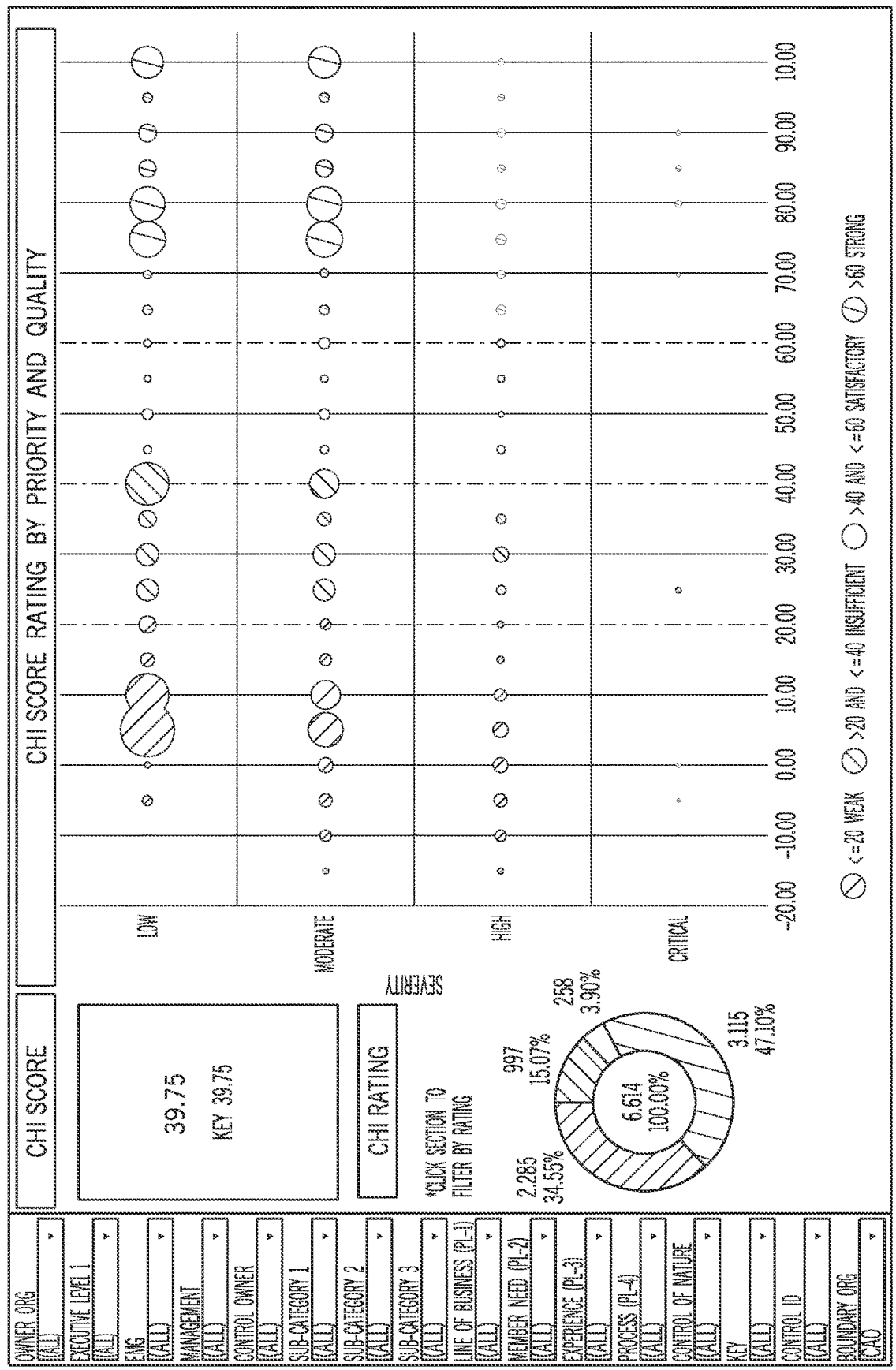
FIG. 8 shows an example graphical user interface, according to embodiments of the present disclosure.

FIG. 8 shows an example graphical user interface including a report that may be navigated by a user of the system 10. Key filters show root employee for EMG (or more granular) filtering. Also shown are sub-categories 1-3 that provide functional level filtering and process level filters 1-4. Custom boundary and buffer allow a KRI like approach to establish a range of desired control targets The rating provides counts by score ranges:

Weak<=20
Insufficient>20 and <=40
Satisfactory>40 and <=60
Strong>60

In a scatter plot of index scores the density of circle is dictated by distinct count of controls and colors mirror rating scores. Thus, the disclosed techniques include a novel graphical user interface for viewing control information.

Figure 9:
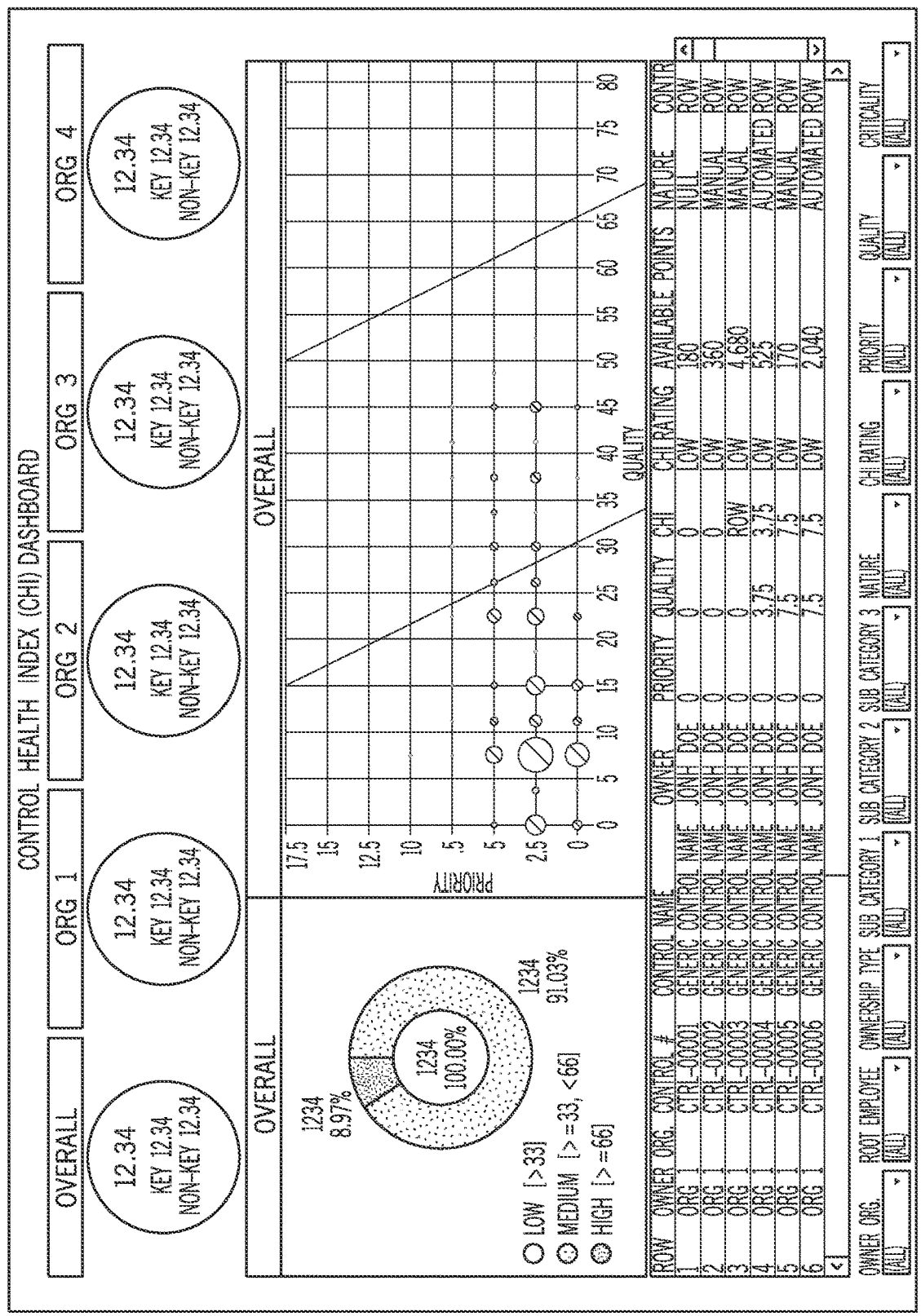
FIG. 9 shows an example graphical user interface, according to embodiments of the present disclosure.

FIG. 9 shows an example graphical user interface including a report that may be navigated by a user of the system 10. The disclosed system 10 may score controls individually, by section, or subsection, and adjusts to filers. The controls may be grouped to ranges and compared to minimum standards that are established using historical data. Datasets are queried and refreshed upon filtration.

As shown in the graphical users interface, each control is associated with particular fields that may be populated based on user inputs and/or automatic data input. Fields may include a control name, an owner of the control (generally a responsible employee or employees), and a report of a combined health index and, in embodiments, individual components of the index, such as the priority and quality scores. Because the scoring is dynamic and relative to other scores in the organization, the graphical user interface may include ranking of highest risk controls, and a plurality of visualizations to assist interpretations. These may include charts, histograms, ordered lists, or tables. Further, certain fields may be user-selectable or modifiable. The disclosed techniques permit index assessment even in the absence of information for certain fields. Further, certain fields may not be relevant for a particular control. In an embodiment, an empty field in the index assessment is treated as a zero. Thus, the system 10 can move forward with an estimated index for queried fields even if the available entries are incomplete.

Figure 10:
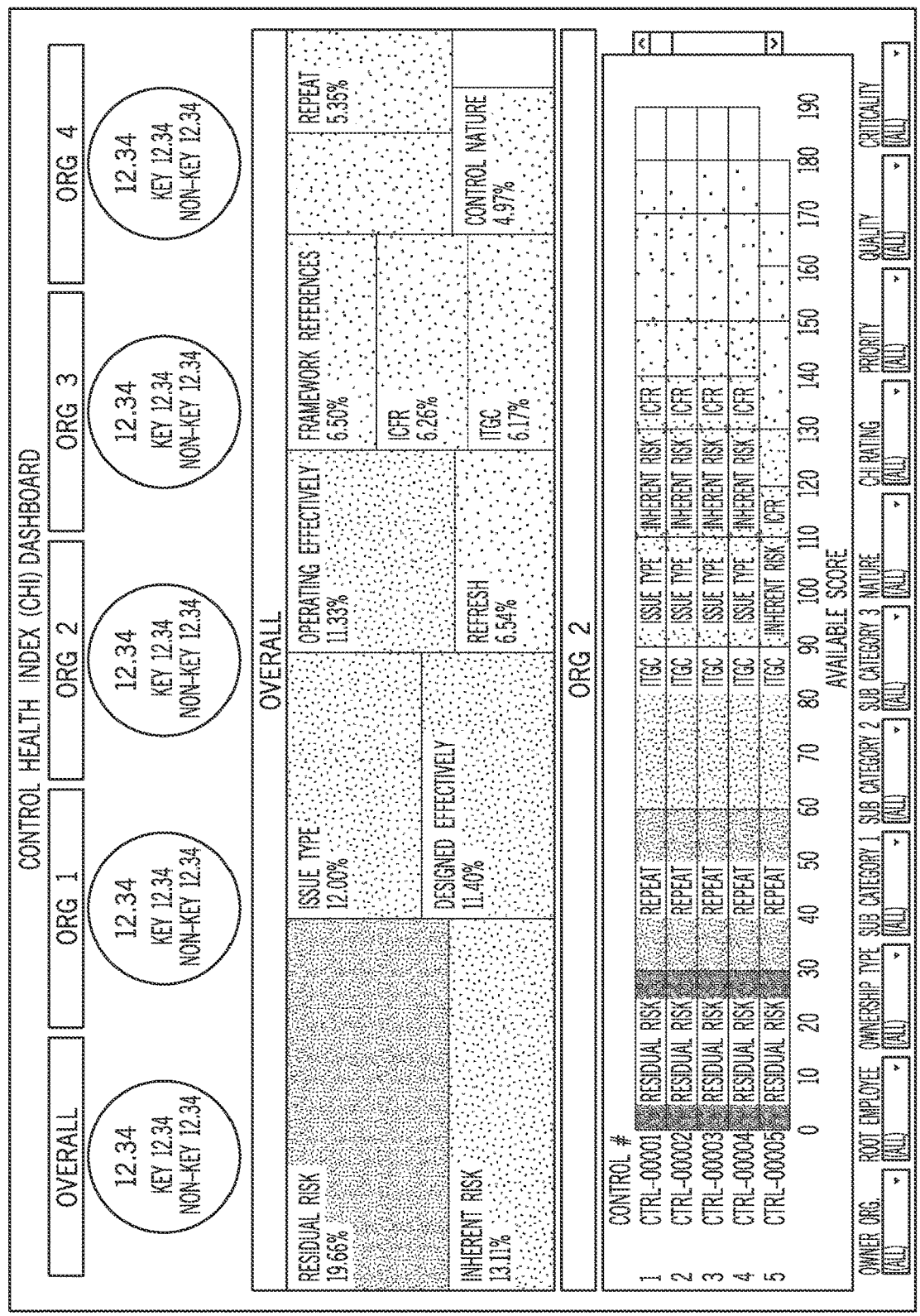
FIG. 10 shows an example graphical user interface, according to embodiments of the present disclosure.

FIG. 10 shows an example graphical user interface including a report with a percentage of controls with points available by attribute and points attributed by control. That is, the graphical user interface may provide a visualization of points left on the table or potentially available as areas of potential improvement. The interface may rank categories across an organization as points of potential improvement.

Figure 11:
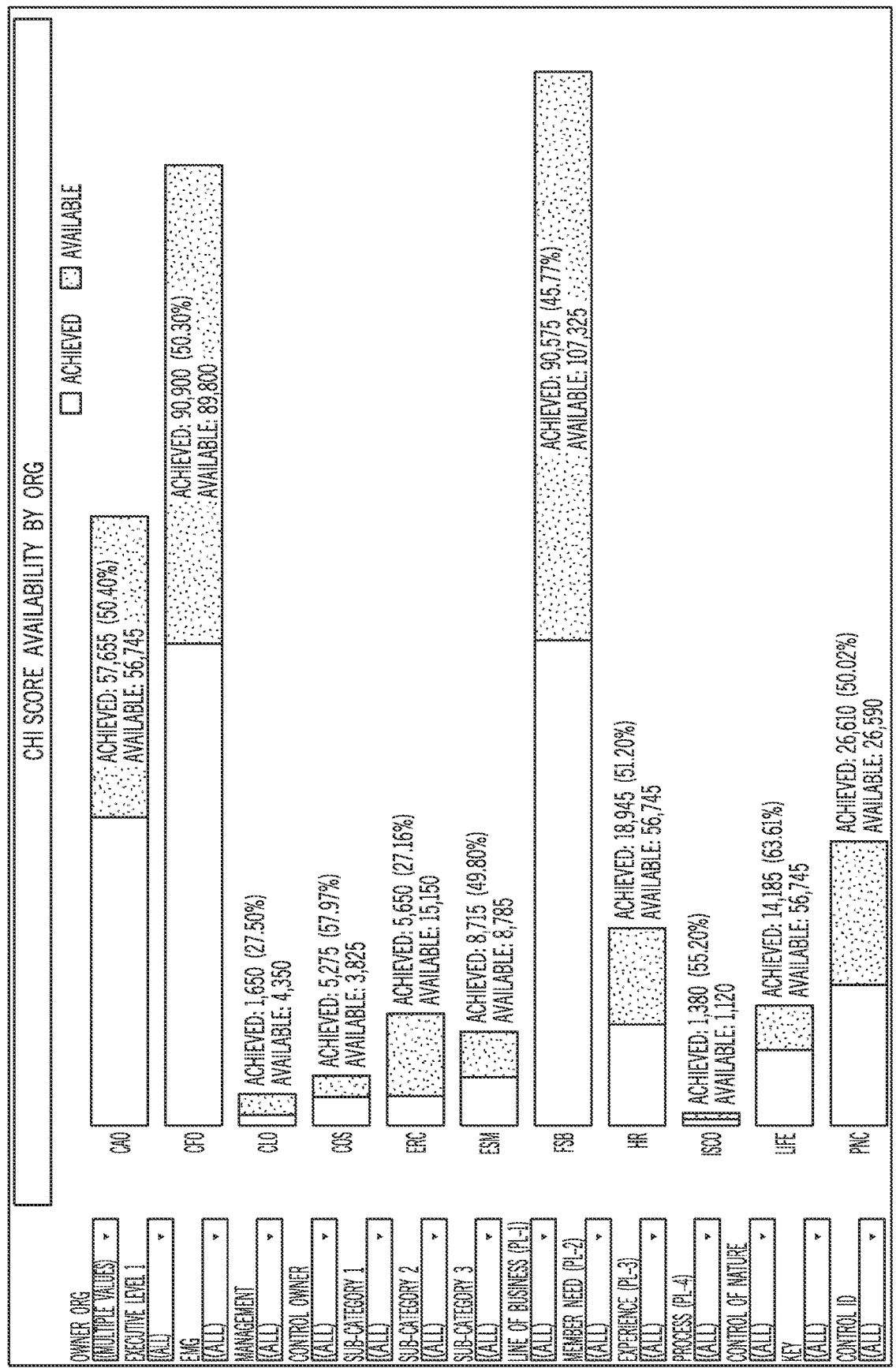
FIG. 11 shows an example graphical user interface, according to embodiments of the present disclosure.

FIG. 11 shows an example graphical user interface including a report with operational views showing current quality achieved, current priority achieved, and total achieved out of total available. The data provides availability details (where points can be earned to improve an index).

Figure 12:
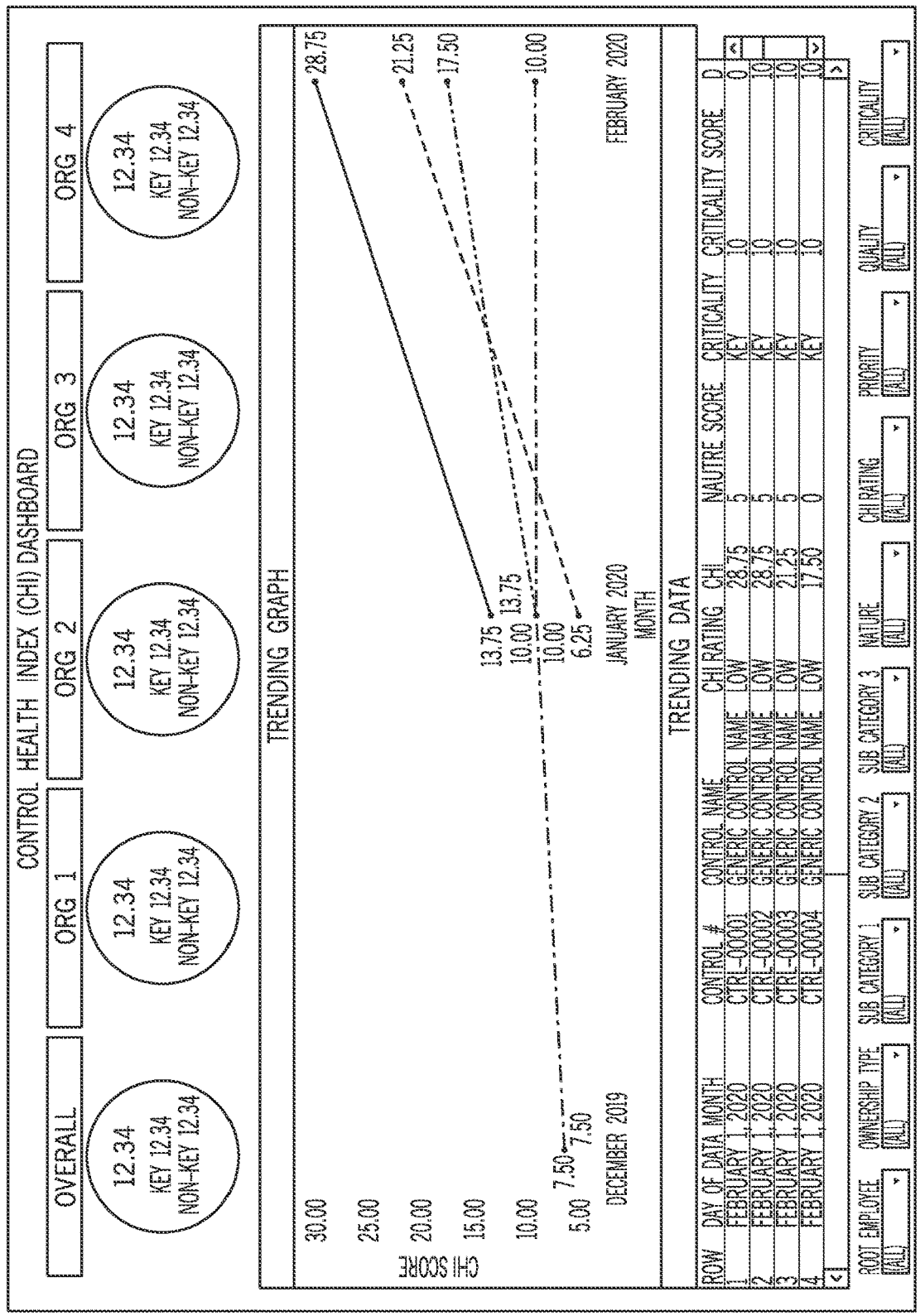
FIG. 12 shows an example graphical user interface, according to embodiments of the present disclosure.
Figure 13:
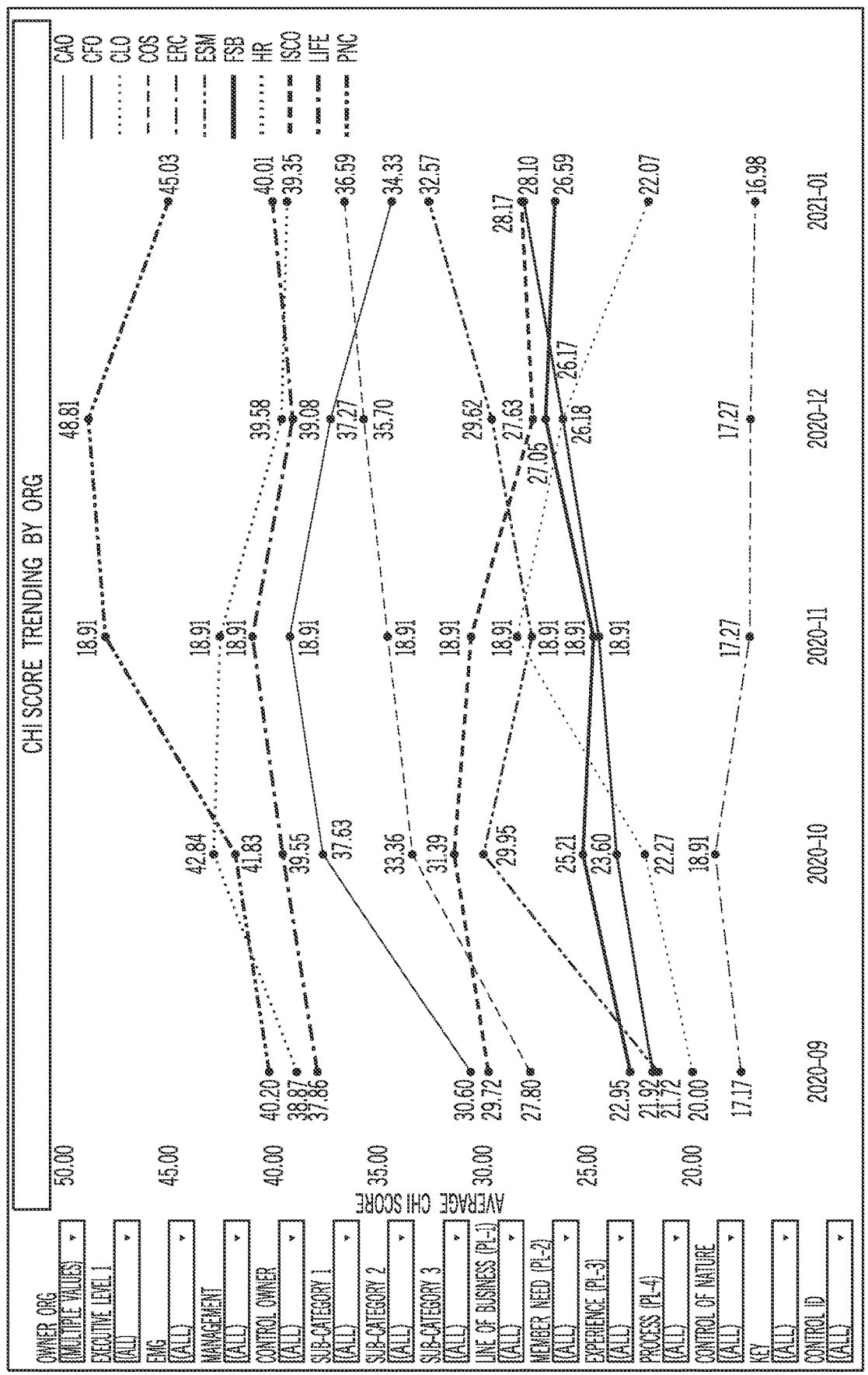
FIG. 13 shows an example graphical user interface, according to embodiments of the present disclosure.

FIG. 12 shows example graphical user interfaces including a report with trend data. As shown in FIG. 12, the trend may indicate rising or falling index scores over time. Further, controls may be flagged as key or non-key, and the scores can be separated out according to these designations. In one embodiment, different control indices across a department or subsection of an organization can be averaged and separated into key vs. non-key indices. The controls can be separated by organization (for inter-organization comparisons), department, functionality, and employee-owner. Further, controls associated with employees at various levels may be identified and aggregated by executives, direct reports, or other designations. In one embodiment, the system 10 is configured to identify and flag changes in individual control health indices in a positive or negative direction and generate a notification.

FIG. 14 shows examples of controls with triggers and alerts based on sensor data. For example, a particular control may be an alarm review that is scheduled to occur according to a present interval. In one example, validation of duress alarms are tested to be functioning properly by activating the alarm and verifying the alarm is triggered in CCURE/Situator to ensure timely and appropriate response to emergency incidents that may impact workforce and property assets. If a duress alarm does not trigger correctly, the SOC Operator and/or delegate will submit a work order and/or front door request for resolution. Accordingly, the system 10 receives sensor inputs from environmental sensors 28 related to proper alarm triggering, e.g., on a quarterly basis. In another example, a security control category may receive sensor inputs each time there is a door forced, emergency exit, input door breach, door held, or secure area breach door event in the physical access control system. A Security Operations Center (SOC) operator will acknowledge the event within 2 minutes. If the event is not acknowledged within the timeframe, a notification is automatically routed to the supervisor or delegate for decision. The timeliness and completeness of acknowledgment in addition to data on total security events may be data inputs to control category data for a security data category.

Further, data may be collected on access to organization property and facilities. If it is identified that procedures are not being followed, the Supervisor and/or delegate will escalate and determine appropriate actions. Every 15 minutes, a file containing changes to Human Resource (HR) person records is automatically sent to the physical security access control system to prevent unauthorized access to organization property and facilities. The service account automatically updates the database with the current file, thereby disabling functionality and clearances for individuals classified as Termination, Death, or Retired. Access to all areas secured by badge readers is automatically validated in real-time by the system as each badge is presented for all locations. If access attempts exceed the limits defined by the system, access is denied for each occurrence. The system rules for access are defined in the system and are determined by job function or responsibilities (i.e. active, clearance level, anti-passback exemption).

The control health indices for each control include priority and quality components. A higher priority for a control pushes up an overall index score, which in turn provides higher value and impact to quality improvements made to that control relative to certain lower priority controls. Thus, an organization can assess risk controls that will be beneficial to improve. Further, an organization can create a risk improvement score for proposed system installations. In one example, automation and increased monitoring may serve to improve a quality score for a particular control. However, if that control is low priority, the improvements are appropriately weighted as being less impactful for the overall risk of the organization. In contrast, implementing the same automation and increased monitoring on a high priority control may be a more efficient use of resources.

Figure 15:
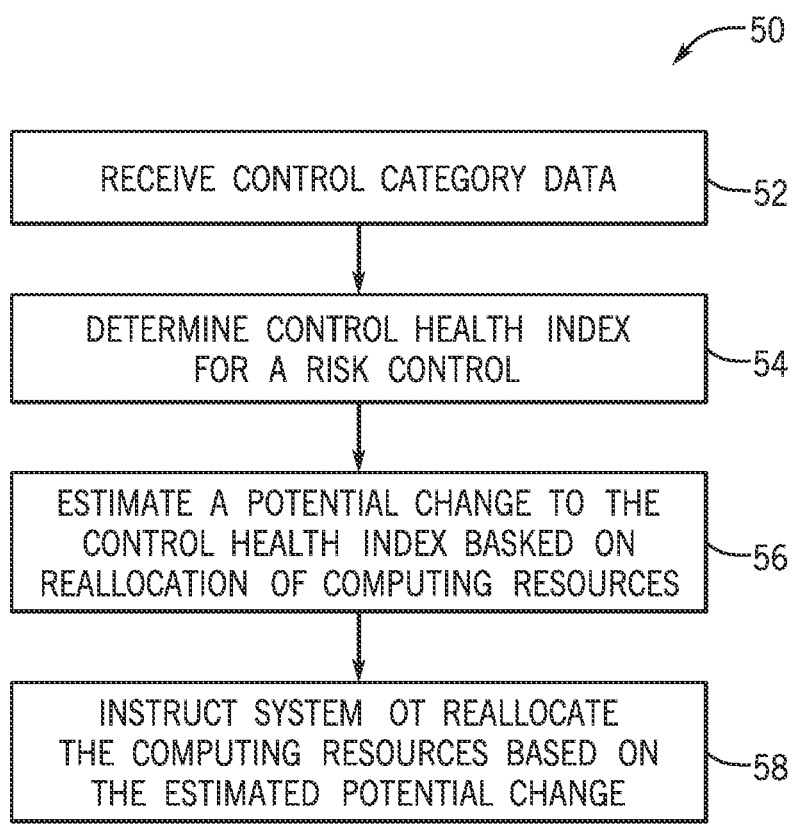
FIG. 15 is a flow diagram of using control health indices to allocate computing resources, according to embodiments of the present disclosure.

Thus, in one embodiment, as shown in the flow diagram of FIG. 15, processing burden and utilization of cloud or other computing resources may be distributed in an organization based on the control health indices as provided herein. The method 50 receives control category data (block 52) as provided herein, e.g., via one or more sensor signals or manual inputs. Based on the control category data, one or more control health indices are determined (block 54). In an example, a decision to allocate additional processing or data storage to a particular computing subsystem is based on an estimated potential change to the control health index or indices positive delta control health index associated with the allocation (block 56). The allocation may be associated with decreased risk by improving security, increasing monitoring frequency, and/or automating certain features. When the estimated delta control health index is above a predetermined threshold, the system 10 is instructed to make the change in allocation of computing resources (block 58). Further, requests for computing resources within an organization may be assessed based on estimating changes to a control health index as a result of the allocation and approving only highest-ranked estimated changes or only requests above a threshold change. In this manner, an organization with limited resources, such as database space or access to cloud computing, may more efficiently distribute these computing resources. An organization may allocate database storage based requests to back up data. However, these allocations may also be assessed based on risk. If the data is associated with a low risk control, the redundancy standards may be relaxed for these controls. Thus, the elimination of data that need not be duplicated in storage permits more efficient use of computing resources.

As provided herein, data storage may be evaluated based on a control health index associated with the data. Further, database settings may be selected based on a threshold control health index associated with the data. That is, the particular data may be assigned to one or more controls, each having a particular control health index. For controls with relatively high scores, using less stringent database settings may have less effect on the overall control health index, thus improving data storage efficiency. In one example, the polling settings of a database may be set to less stringent or default settings if such a change is assessed to have less than a threshold negative effect on a control health index associated with the data in the database. Polling settings may include changing a frequency of request for information, node status calculation, or other data or processing intensive database settings. These settings may be adjusted based on estimated risk as determined by an associated control health index and an estimated effect of a change on this index.

Figure 16:
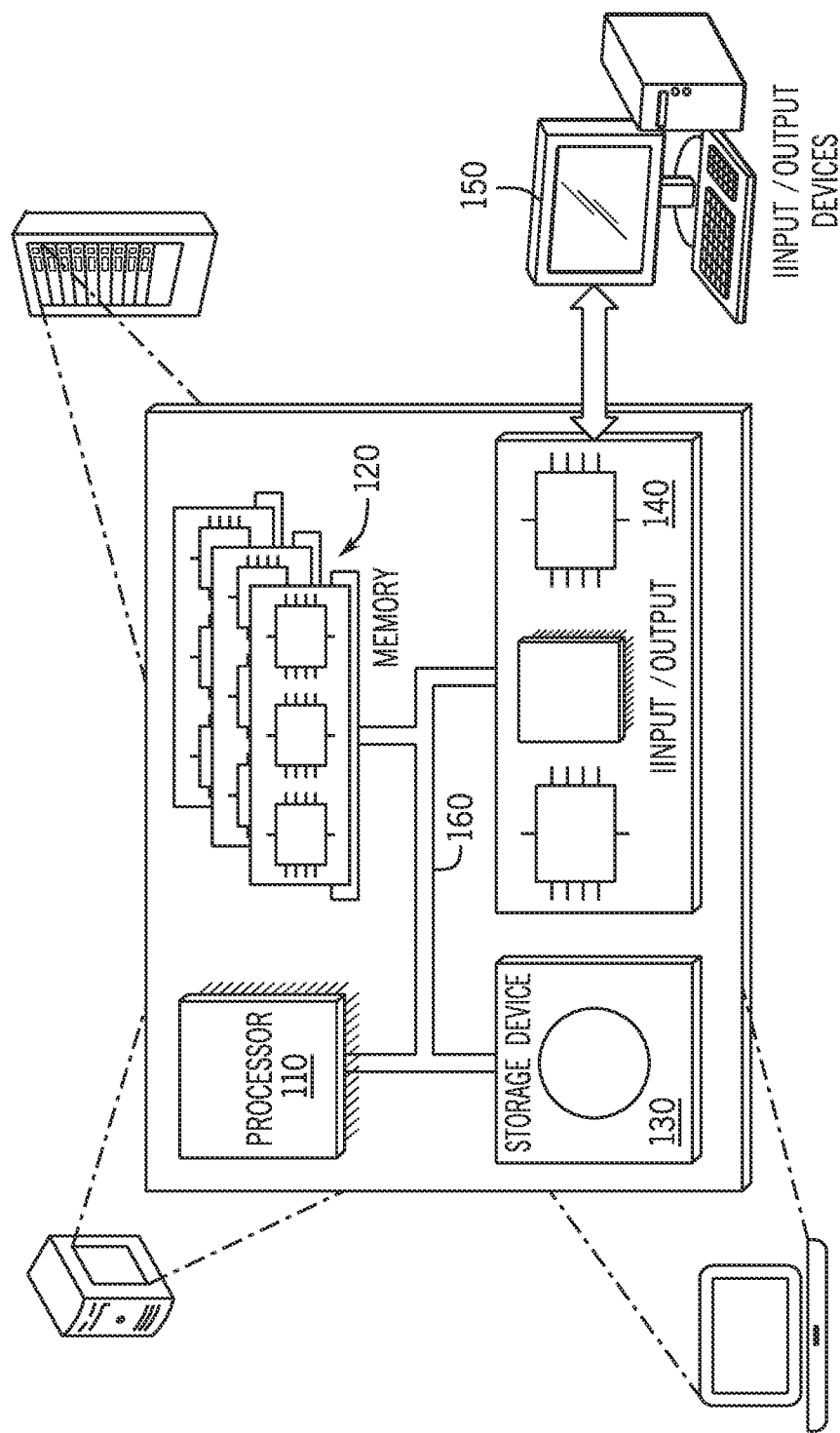
FIG. 16 shows an example computing system, according to embodiments of the present disclosure.

FIG. 16 illustrates an example computing system 12 that the embodiments described herein may use to perform their respective operations. The system may be used for any of the operations described with respect to the various embodiments described herein, including the risk monitoring system described herein. For example, the system 12 may be included, at least in part, in one or more of the computing device(s), and/or other computing device(s) or system(s) described herein. In certain embodiments, the system may include one or more processors 110, one or more memory devices 120, one or more storage devices 130, and one or more input/output (I/O) devices 140 controllable via one or more I/O interfaces 150. The various components may be interconnected via at least one system bus 160, which may enable the transfer of data between the various modules and components of the system.

In certain embodiments, the processor(s) 110 may be configured to process instructions for execution within the system. The processor(s) 110 may include single-threaded processor(s), multi-threaded processor(s), or both. The processor(s) 110 may be configured to process instructions stored in the memory 120 or on the storage device(s) 130. For example, the processor(s) 110 may execute instructions for the various software module(s) described herein. The processor(s) 110 may include hardware-based processor(s) each including one or more cores. The processor(s) 110 may include general purpose processor(s), special purpose processor(s), or both.

In certain embodiments, the memory 120 may store information within the system. In certain embodiments, the memory 120 includes one or more computer-readable media. The memory 120 may include any number of volatile memory units, any number of non-volatile memory units, or both volatile and non-volatile memory units. The memory 120 may include read-only memory, random access memory, or both. In certain embodiments, the memory 120 may be employed as active or physical memory by one or more executing software modules.

In certain embodiments, the storage device 130 may be configured to provide (e.g., persistent) mass storage for the system. In certain embodiments, the storage device 130 may include one or more computer-readable media. For example, the storage device 130 may include a floppy disk device, a hard disk device, an optical disk device, or a tape device. The storage device 130 may include read-only memory, random access memory, or both. The storage device 130 may include one or more of an internal hard drive, an external hard drive, or a removable drive.

One or both of the memory 120 or the storage device 130 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In certain embodiments, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor and the memory may be supplemented by, or incorporated into, one or more application-specific integrated circuits (ASICs).

In certain embodiments, the system may include one or more I/O devices 150. The I/O device(s) 140 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 150 may also include one or more output devices such as a display, LED(s), an audio output device (e.g., a speaker), a printer, a haptic output device, and so forth. The I/O device(s) 150 may be physically incorporated in one or more computing devices of the system or may be external on one or more computing devices of the system.

In certain embodiments, the system may include one or more I/O interfaces 140 to enable components or modules of the system to control, interface with, or otherwise communicate with the I/O device(s) 150. The I/O interface(s) 140 may enable information to be transferred in or out of the system, or between components of the system, through serial communication, parallel communication, or other types of communication. For example, the I/O interface(s) 140 may comply with a version of the RS-832 standard for serial ports, or with a version of the IEEE AA884 standard for parallel ports. As another example, the I/O interface(s) 140 may be configured to provide a connection over Universal Serial Bus (USB) or Ethernet. In certain embodiments, the I/O interface(s) 140 may be configured to provide a serial connection that is compliant with a version of the IEEE AA994 standard.

In certain embodiments, the I/O interface(s) 140 may also include one or more network interfaces that enable communications between computing devices in the system, or between the system and other network-connected computing systems. The network interface(s) may include one or more network interface controllers (NICs) or other types of transceiver devices configured to send and receive communications over one or more communication networks using any network protocol.

Computing devices of the system may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 10 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A risk monitoring system comprising:
    a first database;
    a plurality of sensors that provide sensor data to the first database to populate respective fields of the first database; and
    a computing device comprising:
        a second database; and
        a control system comprising a processor and a volatile memory, wherein the volatile memory comprises processor-executable instructions configured to cause the processor to:
            receive data from the first database;
            populate fields of the second database with the data, wherein the second database assigns the data to an individual risk control of a plurality of risk controls;
            extract control category data of each individual risk control from the second database, wherein each individual risk control comprises a plurality of control attributes indicated by the control category data, wherein each individual control attribute is associated with a category of control attribute of a plurality of categories of control attribute;
            perform a first weighting function on a first subset of the control category data for each individual risk control to generate a first score of the first subset, wherein the first subset of the control category data is related to a first category of control attribute;
            perform a second weighting function on a second subset of the control category data for each individual risk control to generate a second score of the second subset, wherein the first weighting function has a different weight than the second weighting function, wherein the second subset of the control category data is related to a second category of control attribute, and wherein the first subset and the second subset are non-overlapping;
            generate an index for each individual risk control based on a combination of the first score and the second score, wherein the index is part of a plurality of indices of the plurality of risk controls, and wherein each risk index is on a same scale;
            determine an estimated potential change to the index; and in response to the estimated potential change being above a predetermined threshold, allocate additional processing or data storage resources.

2. The risk monitoring system of claim 1, wherein the first subset is a priority subset and wherein the second subset is a quality subset.

3. The risk monitoring system of claim 2, wherein a weight of the first weighting function is less than half of a weight of the second weighting function.

4. The risk monitoring system of claim 1, wherein the processor-executable instructions are configured to cause the processor to:
    receive a proposed change or update to the control category data; and
    estimate a change the index for an individual risk control based on the change or update.

5. The risk monitoring system of claim 1, wherein the processor-executable instructions are configured to cause the processor to:
    display the plurality of indices of the plurality of risk controls.

6. The risk monitoring system of claim 1, wherein the processor-executable instructions are configured to cause the processor to:
    sort the plurality of risk controls based on the plurality of indices; and
    generate a notification related to a ranking of a highest ranking set of the plurality of risk controls.

7. The risk monitoring system of claim 1, wherein the index is determined based on (first subset score)*0.25)+ (second set score)*0.75).

8. The risk monitoring system of claim 1, wherein the first subset score comprises an aggregate priority score comprising requirement mapping, control framework, inherent risk, and control criticality scores.

9. The risk monitoring system of claim 1, wherein the second subset score comprises an aggregate quality score comprising control nature, control operating effectiveness, control design effectiveness, issue identification type, residual risk, control modification, and repeat issue scores.

10. The risk monitoring system of claim 1, comprising a plurality of sensors that generate a portion of the control category data.

11. The risk monitoring system of claim 1, wherein the plurality of sensors comprises a door opening sensor.

12. A method comprising:
    receiving, via a processor, sensor data related to a plurality of risk controls;
    processing, via the processor, the sensor data to generate control category data related to the plurality of risk controls, wherein each individual risk control comprises a plurality of control attributes indicated by a set of the control category data, wherein each individual control attribute is associated with a category of control attribute of a plurality of categories of control attribute;
    performing, via the processor, a first weighting function on a first subset of the control category data for each individual risk control to generate a first score of the first subset, wherein the first subset of the control category data is related to a first category of control attribute;
    performing, via the processor, a second weighting function on a second subset of the control category data for each individual risk control to generate a second score of the second subset, wherein the first weighting function has a different weight than the second weighting function, wherein the second subset of the control category data is related to a second category of control attribute, and wherein the first subset and the second subset are non-overlapping;

generating, via the processor, an index for each individual risk control based on a combination of the first score and the second score, wherein the index is part of a plurality of indices of the plurality of risk controls, and wherein each index is on a same scale;

determining, via the processor, an estimated potential change to the index; and in response to the estimated potential change being above a predetermined threshold, allocating, via the processor, additional processing or data storage resources.

13. The method of claim 12, comprising:

monitoring, via the processor, a change in the index for each individual risk control; and generating, via the processor, a notification when the change is greater than a predetermined threshold.

14. The method of claim 12, wherein the index is determined based on (first subset score)*0.25+(second set score)*0.75).

15. The method of claim 12, comprising displaying, via the processor, the index.

* * * * *